July 8, 1952  R. E. DARLING  2,602,608
PERSONAL EQUIPMENT FOR AIRCRAFT PILOTS
Filed Aug. 9, 1950  2 SHEETS—SHEET 2
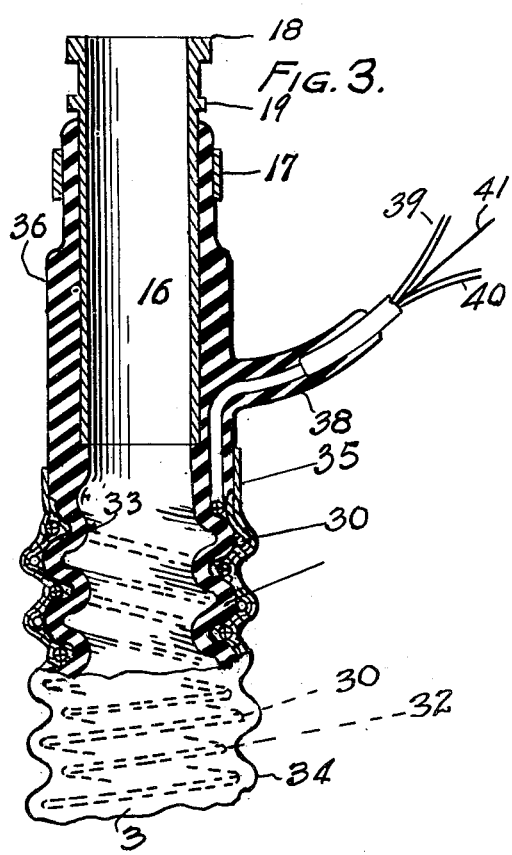
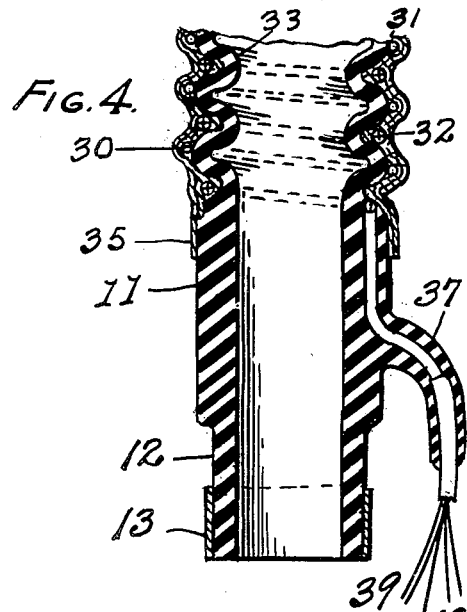
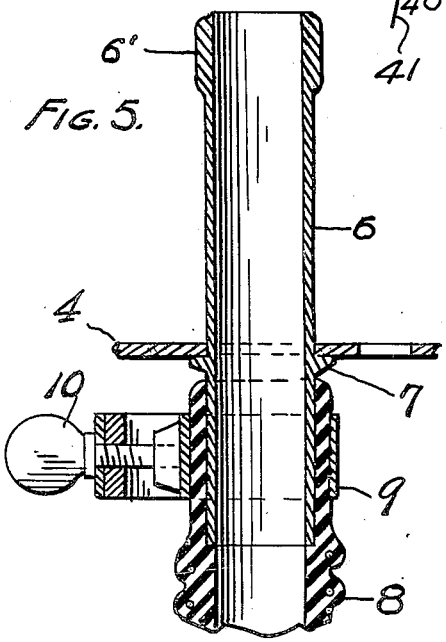
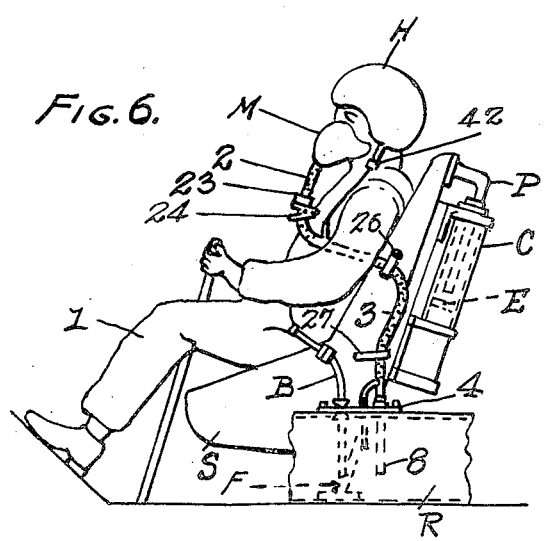
INVENTOR.
RALPH E. DARLING
BY
Charles K. Davies & Son
Attys.

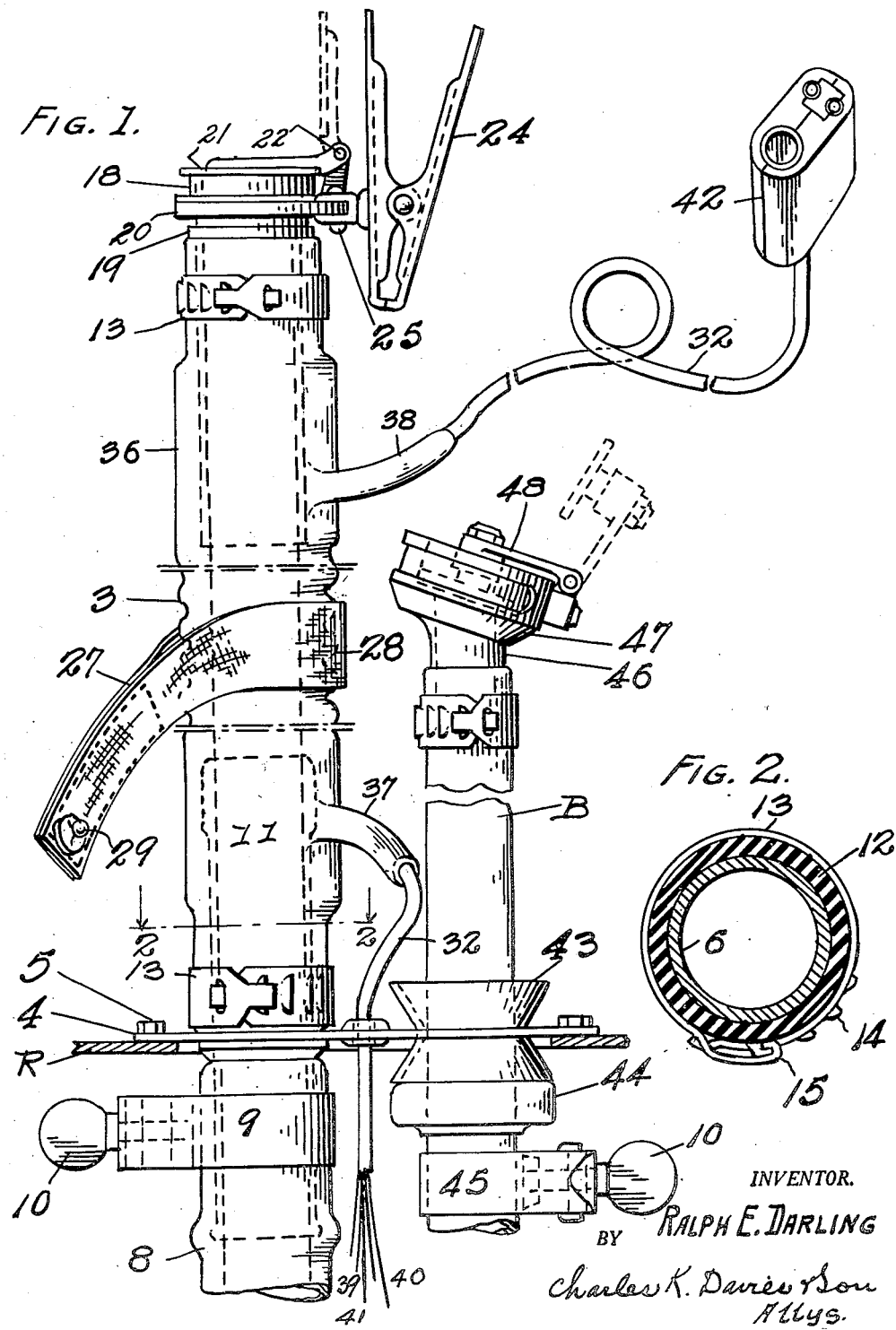

Patented July 8, 1952

2,602,608

UNITED STATES PATENT OFFICE 2,602,608

PERSONAL EQUIPMENT FOR AIRCRAFT PILOTS

Ralph E. Darling, Bethesda, Md.

Application August 9, 1950, Serial No. 178,438

5 Claims. (Cl. 244—1)

1

The present invention relates to improvements in the general class of aeronautics and more specifically to personal equipment for aircraft pilots and others, which equipment includes a quick-disconnect assembly of the pilot's oxygen-breathing gear or system that is designed for use in high-speed aircraft while in flight, and from the cockpit of which a pilot may with safety be automatically launched or ejected, with his seat and parachute, through an open canopy of the aircraft into space, preparatory to becoming airborne by the parachute.

The novel oxygen equipment or gear is based upon a single standardized trunk-line hose that provides a continuous and reliable flow of air and oxygen under pressure from the supply hose within a console in the cockpit of the aircraft directly to the pilot's mask; and the hose, or single tube, also carries invisible and unobstructed electrical circuits with inlets from the source of energy and outlets to earphones, microphones, radios, or other electrical service instruments for the pilot.

The single or one-piece hose having detachable end connections at the console and at the pilot's mask, consists of reinforced rubber or other elastic and resilient material, and it is readily adapted for selective and interchangeable use with existing gearing without material alteration.

The lower end of the oxygen hose is detachably connected with a base plate fixed on the console to form a coupling joint which is quickly and automatically separated by and with the initial movement of the ejection operation of the aviator and the separation or disconnection of the hose from its stationary base is facilitated and assured with safety by the withdrawal of a portion of the hose from the detachable joint that unites the hose with the stationary base. Upon upward movement of the seat in the ejecting operation the hose is moved into axial alinement with the component force of ejection, and therefore a quick, positive disconnection from the stationary base is effected without affecting the pilot, or aviator.

The novel equipment of the invention involves a minimum number of standardized parts that may be manufactured with facility, the parts may be assembled and adjusted with ease preparatory to an airflight by the pilot, and the mechanical and electrical parts of the gear are combined and arranged to insure safety, durability, a maximum efficiency, and with a minimum bulk and weight to occupy a minimum of space in the cockpit of the aircraft.

2

In the accompanying drawings I have illustrated a complete example of a physical embodiment of my invention in which the parts are combined and arranged in accord with one mode I have devised for the practical application of the principles of the invention, it will however be understood that changes and alterations may be made in these exemplifying drawings and structures within the scope of my claims, without departing from the principles of the invention.

Figure 1 is a view in elevation, showing the hose broken and foreshortened for convenience in illustration, disclosing the detachable coupling joint between the hose and its fixed base, the socket-connection at the upper end of the hose for the pilot's mask, and other accessories.

Figure 2 is an enlarged detail section at line 2—2 of Fig. 1 showing the clamp between the trunk line hose, and the supply hose within the console.

Figure 3 is a detail sectional view at the mask-end of the hose; and Figure 4 is a similar view at the lower or base-end of the hose.

Figure 5 is a sectional view showing the fixed coupling sleeve from which the hose has been disconnected.

Figure 6 is a diagrammatic view, in side elevation, showing a pilot in his seat, and means for ejecting the seat, together with the arrangement of the oxygen breathing hose equipped with the required electrical connections.

In order that the general arrangement and utility of parts may readily be understood, reference is made to Fig. 6 where a portion of a fixed frame F is located in the cockpit of an aircraft, and from which the pilot's seat S may be launched or ejected upwardly at the usual incline through the upper open canopy of a cockpit. For this purpose any suitable mechanism may be employed, as for instance the back of the seat may be equipped with power operated mechanism P that initially extends downwardly into the interior of an expansion or explosive cylinder C that is rigidly mounted on the frame F behind the seat. The base of the cylinder is equipped with means such as an explosive charge, which, by detonation and expansion of gases of combustion against an ejecting piston E, causes the piston to contact the lower end of the rod P of the seat, for ejecting the seat and its occupant. After the canopy over the cockpit has been jettisoned in usual manner, the customary action by the pilot by pulling down a flexible covering for his face, activates the ejecting mechanism, and after ejection the pilot unfastens his safety belt to free himself from the seat, and he finally pulls the ripcord to open his parachute for a descent.

The invention contemplates the personal gear of the pilot including his flying suit 1, protective helmet H, mask M, and pilot's short hose 2; and the usual body-hose B or lead is attached to the suit for anti-G pressure with its lower end detachably anchored to the console or receptacle R in the cockpit.

The single piece oxygen-breathing trunk line hose indicated as a whole by the numeral 3, which is fashioned of rubber or other suitable elastic and resilient material is detachably anchored with a base plate 4 that is attached at 5 to the top wall of the console or receptacle R. For detachably anchoring the disconnectible hose 3 to the console with the base plate 4, this plate is equipped with an upright metallic, or rigid, coupling sleeve 6, having an exterior swelling or friction head 6' at its upper end. The cylindrical tube or sleeve projects upwardly through a slot in the base plate and an exterior stop collar 7 on the coupling sleeve bears against the underside of the base plate to prevent upward movement of the coupling sleeve when the seat and its occupant are ejected from the aircraft.

Within the console or receptacle R the usual oxygen-supply hose 8 is mounted upon the lower end of the coupling sleeve 6, and this hose is fastened on the sleeve by a suitable device as an annular clamp 9 and its clamping screw 10.

The lower bell-end 11 of the trunk hose 3 is initially slipped over the headed end 6' and then downwardly over the exterior of the coupling sleeve 6, and this bell-end terminates in a soft rubber or elastic extension or collar 12 that may easily be expanded to slip over the head of the coupling sleeve. The lower end of the hose is attached or fastened to the stationary coupling sleeve by means of a split ring or metallic band 13 that surrounds the collar or extension of the hose and forms a clamp device. As here shown this adjustable clamp includes a series of upset rack teeth 14, a clamp hook 15 on one end of the band for coaction with the teeth, and the other end of the band as 16 is slipped through a guiding and retaining slot in the band.

The clamp normally and rigidly secures the lower end of the hose 3 upon the upstanding coupling sleeve, and the sleeve is of ample length to support this end of the hose. As the occupied seat is ejected and the hose is axially alined with the direction of movement of the seat, the soft clamp-collar 12 of the hose is stretched longitudinally, thereby reducing its thickness, with the result that the clamp-collar is released from the clamp 13, and the lower end of the hose is pulled in a straight line from the stationary coupling sleeve.

The upper or outlet end of the hose 3 is also equipped with an inner metallic coupling sleeve, as 16, secured by a clamp device 17 that surrounds the hose, and the exposed end of the coupling sleeve is fashioned with exterior annular flange 18 and a spaced annular collar 19. Between the flange and the collar a swivel ring 20 is mounted on the sleeve 16, and an automatically spring-closed outlet valve 21, for the open end of the sleeve, is hinged at 22 upon an upright flange of the swivel ring 20. When the valve is opened, as indicated by dotted lines in Fig. 1, a plug and socket connection is made at 23 (Fig. 6) between the pilot's hose 2 and the coupling sleeve 16 of the trunk hose 3.

For anchoring the upper end of the hose to a portion of the pilot's suit a quick detachable fastener, or spring clasp 24, is swiveled at 25 on the swivel ring 22 for convenience of the pilot, in arranging the hose, which as shown passes under an arm of the pilot. In the initial position of a compound curve, a portion of the hose 3 is suspended, loosely, from the seat back by a quick detachable fastening or clamp 26, and in addition a restraining strap 27 is looped around the hose at 28, with the end of the strap fastened to the seat by means of a snap-fastener including the head 29 on the strap that coacts with a socket on the seat.

In the process of manufacturing the trunk hose from a suitable length of rubber tube, a helical reinforcing wire spring 30 is longitudinally stretched to surround and form spaced spirals about the cylindrical tubular stock of the hose, and then the helical spring is encased within a wrapped tape that is cemented on the tube to form a protective sheath as 31. An electrical cable 32 is forcibly wound under suitable tension and in helical formation about the sheathed tube in such manner that the spirals of the cable, which are interposed between the spirals of the helical spring, inwardly depress the cylindrical and elastic wall of the tube to form a continuous inner spiral rib 33 as well as a complementary exterior valley in which the cable is seated, and the depressed and sheathed wall of the tube is thus formed with an exterior and continuous rib as 34 about which the helical spring has previously been coiled.

To complete the oxygen hose, an outer wrapper, stockingette, or knitted jacket 35, following the convolutions or spirals of the sheathed tube and enclosing the spiral cable, is cemented to the sheath 31. The sleeve 11 at the lower end of the hose, and a similar sleeve 36 at the outlet end of the hose, are each molded upon the cylindrical tubing, and fashioned respectively with an inlet nipple 37 and an outlet nipple 38, through which the cable is extended to and from the hose.

The cable 32, which as shown includes pairs of conductors or wires forming two electrical circuits as 39 and 40, is also equipped with a tension cord 41 interwoven with the insulated wires, which relieves strains on the spirally wound cable as the latter is being embodied as a component part of the hose.

The cable enters the nipple 37 from its source of energy from the interior of the receptacle R, and a suitable length of cable is extended from the nipple 38 to accommodate a socket connector 42 to which a complementary plug-connector may be attached for the conductors that complete the circuits for the earphones, microphones, or other electrical instruments.

In Fig. 1 the usual body hose B, which passes through a double-end anchoring collar 43 mounted in a slot of the base plate 4, is retained against displacement by an annular rubber collar 44 bearing against the lower end of the collar 43, and this hose, within the receptacle R is provided with a screw clamp 45. The upper end of the body hose is provided with a usual metallic coupling sleeve 46, and a socket coupling head 47 that is initially closed by a spring valve 48 hinged to the head. The socket head is adapted to receive a plug head on the section of the body hose that is attached to the section of the hose that completes the connection to the suit of the pilot.

While I have illustrated and described this one specific adaptation and use of the novel air or oxygen-breathing hose it will be obvious that the hose may be embodied in the safety equipment for various other personal uses, such for instance in standard types of aircraft, in chemical as well as tank warfare, and with equal facility the hose may be adapted for use by Navy personnel in surface vessels and sub-surface vessels, and by fire-fighters.

Having thus fully described my invention, what I claim as new and desire to secure by Letters Patent is:

1. The combination in personal equipment for an aircraft pilot including an elastic and resilient oxygen hose having continuous inner and outer helical ribs and terminating in coupling sleeves, of a plurality of electrical conductor wires arranged in the valley formed by the outer rib, a protective sheath encasing the hose and conductor wires, exterior nipples on said sleeves through which the conductor wires pass, and means for completing an electrical circuit through the conductor wires.

2. The combination in personal equipment for an aircraft pilot including an elastic oxygen hose having continuous inner and outer helical ribs and terminating in coupling sleeves, of a coil-wire spring surrounding the outer rib, a plurality of electrical conductors forming a cable arranged in the valley formed by the outer rib, a protective sheath encasing the spring and conductors, and spaced supporting means on the hose for leading in and for leading out the electrical conductors.

3. The combination in personal equipment for an aircraft pilot including an elastic hose having an outer helical rib and terminating in coupling sleeves, of a coiled-wire spring surrounding the rib and an electrical cable arranged in the valley of the rib, a protective sheath encasing the cable and spring, and exterior nipples on said sleeves forming inlet and outlet supports for the cable.

4. The combination in personal equipment for use with an ejectable seat for highspeed aircraft having a cockpit and console, with an elastic and resilient oxygen hose, and a fixed coupling sleeve mounted on the console, of an integral coupling sleeve of the hose detachably mounted on the fixed sleeve, a second coupling sleeve integral with the hose, a cable of electrical conductors exterior of the hose and a protective sheath encasing the cable and hose, and means on the integral coupling sleeves forming inlet and outlet supports for the cable.

5. The combination in personal equipment for use with an ejectable seat for highspeed aircraft having a cockpit and receptacle, with an elastic and resilient oxygen hose having integral coupling sleeves at its ends, and a valved-coupling having a sleeve rigidly mounted in one of the integral sleeves, of a fixed coupling sleeve encased by the other integral sleeve, a releasable clamp surrounding the second integral sleeve and adapted to be forcibly released, a cable of electrical conductors exterior of the hose and a flexible sheath encasing the cable and hose, an inlet nipple for the cable integral with one integral sleeve, and an outlet nipple for the cable integral with the other integral sleeve.

RALPH E. DARLING.

REFERENCES CITED

The following references are of record in the file of this patent:

UNITED STATES PATENTS

| Number | Name | Date |
| --- | --- | --- |
| 11,171 | Minthorn | June 27, 1854 |
| 382,557 | Schimper | May 8, 1888 |
| 419,988 | Davis | Jan. 21, 1890 |
| 1,746,701 | Kimmich | Feb. 11, 1930 |
| 2,264,815 | Thomson | Dec. 2, 1941 |
| 2,396,059 | Roberts | Mar. 5, 1946 |
| 2,494,207 | Sabbia | Jan. 10, 1950 |
| 2,524,522 | Gilmore | Oct. 3, 1950 |

FOREIGN PATENTS

| Number | Country | Date |
| --- | --- | --- |
| 501,236 | Great Britain | Feb. 20, 1939 |